__US005202829A__

United States Patent [19]

Geier

[11] Patent Number: 5,202,829
[45] Date of Patent: Apr. 13, 1993

[54] EXPLORATION SYSTEM AND METHOD FOR HIGH-ACCURACY AND HIGH-CONFIDENCE LEVEL RELATIVE POSITION AND VELOCITY DETERMINATIONS

[75] Inventor: George J. Geier, Santa Clara, Calif.
[73] Assignee: Trimble Navigation Limited, Sunnyvale, Calif.
[21] Appl. No.: 713,438
[22] Filed: Jun. 10, 1991
[51] Int. Cl.$^5$ .............................................. G01S 5/02
[52] U.S. Cl. ................................... 364/449; 364/459; 342/357; 342/457
[58] Field of Search ............... 364/443, 449, 457, 459; 73/178 R; 342/357, 358, 457

[56] References Cited

U.S. PATENT DOCUMENTS

| | | | |
|---|---|---|---|
| 4,445,118 | 4/1984 | Taylor et al. | 342/357 |
| 4,613,864 | 9/1986 | Hofgen | 342/357 |
| 4,646,096 | 2/1987 | Brown | 342/358 |
| 4,751,512 | 6/1988 | Longaker | 342/457 |
| 4,814,711 | 3/1989 | Olsen et al. | 364/449 |
| 4,894,662 | 1/1990 | Counselman | 342/357 |
| 5,017,926 | 5/1991 | Ames et al. | 342/357 |
| 5,099,245 | 3/1992 | Sagey | 342/357 |

Primary Examiner—Gary Chin
Attorney, Agent, or Firm—Thomas E. Schatzel

[57] ABSTRACT

An embodiment of the present invention is a shipboard GPS positioning system having data links to outlying tailbuoys equipped with respective GPS receivers. On ship, an Intel 386-based microcomputer system collects data from various ship's equipment including the ship's GPS receiver and data from the several tailbuoy units. A computer-implemented process located in the microcomputer system controls the following processes. Periodically each GPS receiver produces updated pseudo ranges (PRs) and these are time-tagged. The time-tagged PRs for the ship are aligned according to their time tags with their counterpart PRs from the tailbuoys. The raw PRs are then passed through a Kalman mathematical filter to produce filtered pseudoranges ($\hat{P}Rs$). A position solution is then attempted for each GPS receiver using the $\hat{P}Rs$. The filters provide statistical data that is used to rate the quality of each $\hat{P}R$ in a weighted least squares solution process. Special measures are included to provide quality control/quality assurance, including the use of error ellipses on the display to present a graphic indication of expected solution accuracy, and the use of real time fault detection, isolation, and correction algorithms when redundant satellite information is available.

10 Claims, 8 Drawing Sheets

Fig_1

Fig_2

Fig.4

Fig_5

Fig_6

Fig_7

Fig_8

Fig_11

EXPLORATION SYSTEM AND METHOD FOR HIGH-ACCURACY AND HIGH-CONFIDENCE LEVEL RELATIVE POSITION AND VELOCITY DETERMINATIONS

BACKGROUND OF THE INVENTION

1. Field of the Invention

The invention relates generally to global positioning system (GPS) devices and more particularly to systems and methods for the simultaneous position and/or velocity determinations of a plurality of ground-based units where the ground-based units' positions relative to one another and their absolute positions need to be determined for the same instant, and where the ground-based units have signal acquisition of a common set of GPS satellites. (The term "ground-based" includes anywhere on Earth, e.g., undersea, on-the-sea, on-the-land, and in-the-air.)

2. Description of the Prior Art

The United States of America Department of Defense has placed in orbit a group of satellites, as part of a global positioning system (GPS), that can be used by civilians and the military alike to get automated and highly-accurate earth position coordinates on easy to read digital displays. Determining where you are has been a particular problem for seafarers for thousands of years. Now, GPS enables small sailboat owners and even combat soldiers to get their positions to within several meters using handheld portable equipment.

Ocean and sea-bottom surveying equipment routinely use earth positions to generate geologic studies of earth strata. A typical geologic survey method involves setting off an explosive charge that creates a shockwave and then records the reflections that arrive at several locations in the general area. Using well-known survey techniques, the reflected sound information can be analyzed, and three-dimensional images of the structures can be reconstructed by computer and displayed on a screen. Critical to the analyses are the respective locations of the source of the shockwave and the locations of the individual listening stations. The computer depends on having extremely accurate relative positions for the above. The absolute position of such a group is more important to the users, rather than the computer. The absolute positions are used to pinpoint structures on the map, so that they may be visited again.

Previous systems have made absolute determinations of where the respective groups members are, and then solved from that what the relative orientations are. Each GPS receiver is usually able to acquire the signal of several GPS satellites at once. Normally three range measurements are required to triangulate a location, but four are actually needed with GPS to correct local clocks to GPS system time. The individual distance legs from each GPS satellite to each GPS receiver are therefore called pseudo ranges (PR). Therefore, for four SVs and two GPS receivers, eight PRs will be generated.

The present invention solves the problem of finding the relative distance between GPS receivers by time-tagging candidate PRs, aligning like tagged PRs from respective GPS receivers, and subtracting the difference between corresponding PRs to arrive at highly accurate relative position determinations. This is a so-called "range-domain" approach, rather than the more conventional "position-domain" approach referenced in the previous paragraph.

SUMMARY OF THE PRESENT INVENTION

It is therefore an object of the present invention to improve systems and methods for the simultaneous position and/or velocity determinations of a plurality of ground-based units where the ground-based units' positions relative to one another and their absolute positions need to be determined for the same instant, and where the ground-based units have signal acquisition of a common set of GPS satellites.

Briefly, a preferred embodiment of the present invention is a shipboard system with data links to outlying tailbuoys equipped with respective GPS receivers. On ship, an Intel 386-based microcomputer system collects data from various ship's equipment including the ship's GPS receiver and data from the several tailbuoy units. A computer-implemented process located in the microcomputer system controls the following processes. Periodically each GPS receiver produces updated pseudo ranges (PRs) and these are time-tagged. The time-tagged PRs for the ship are aligned according to their time tags with their counterpart PRs from the tailbuoys. The raw PRs are then passed through a Kalman mathematical filter to produce filtered pseudo-ranges (PRs). A position solution is then attempted for each GPS receiver using the PRs. The filters provide statistical data that is used to rate the quality of each PR in a weighted least squares solution process.

An advantage of the present invention is that it provides an improved system and method of positioning.

Another advantage of the present invention is that error ellipses on computer displays rapidly convey statistical information to users about the quality of the position information being viewed.

Another advantage of the present invention is that statistical error information on each satellite's pseudo-range data is weighed into a final position solution.

Another advantage of the present invention is that pseudo-ranges from one or more satellites having the least statistical confidence level can be isolated and removed from a final position solution if sufficient satellites are tracked.

Another advantage of the present invention is that multi-path signals can be effectively identified as such and filtered out.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a GPS positioning system for a ship and several tailbuoys according to the present invention;

FIG. 2 is a block diagram of several of the major elements of the system of FIG. 1;

FIG. 3 is a block diagram of the inputs and outputs for the ship board CPU of the system of FIG. 1;

FIG. 4 is a top level flowchart for a computer-implemented process that runs on the CPU of FIG. 3;

FIG. 5 is a flowchart of the GPS SHIP CALC subroutine of the computer-implemented process of FIG. 4;

FIG. 6 is a flowchart of the position & velocity update subroutine of the computer-implemented process of FIG. 4;

FIG. 7 is a flowchart of the GPS BUOY CALC subroutine of the computer-implemented process of FIG. 4;

FIG. 8 is a flowchart of the nonlinear-correction subroutine of the computer-implemented process of FIG. 4;

FIG. 9 is a flowchart of the second-order space vehicle (SV) code/carrier filtering correction subroutine of the computer-implemented process of FIG. 4;

FIG. 10 is a flowchart of the alternative third-order space vehicle (SV) code/carrier filtering correction subroutine of the computer-implemented process of FIG. 4;

FIG. 11 is a flowchart of the solution reference-time finding subroutine of the computer-implemented process of FIG. 4;

FIG. 12 is a flowchart of the subroutine for computing the cofactor-matrix and solution update in the computer-implemented process of FIG. 4;

FIG. 13 is a flowchart of the fault detection isolation & correction (FDIC) subroutine of the computer-implemented process of FIG. 4; and FIG. 14 is an illustration of a typical screen display presented to a user of the system of FIG. 1.

DETAILED DESCRIPTION OF THE PREFERRED EMBODIMENTS

Figure 1:
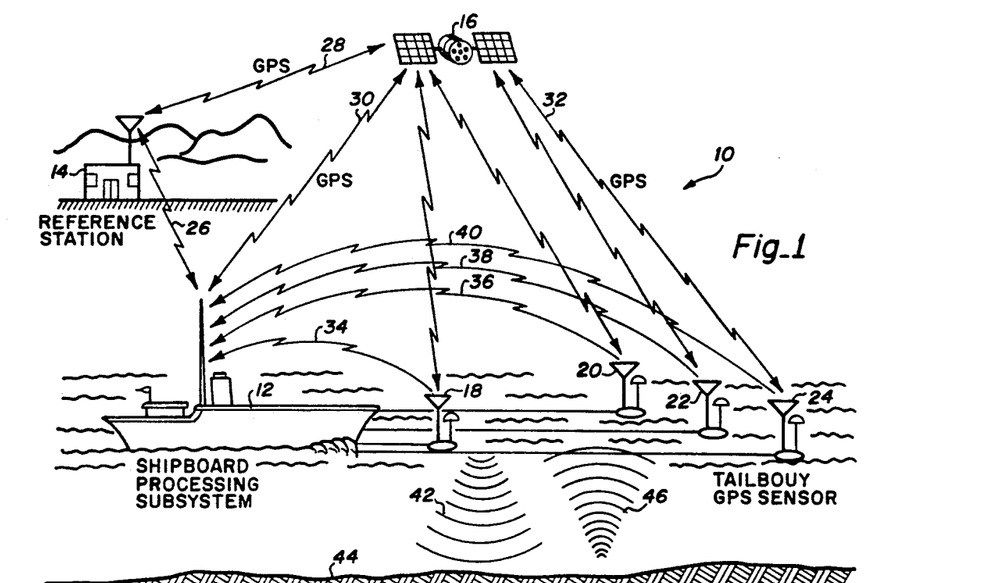

FIG. 1 shows an offshore oil exploration system 10 for providing two to five meter location accuracy for hydrophone streamer tailbuoys. System 10 is a first embodiment of the present invention, and comprises a main system 12 onboard a ship, an optional reference station 14, a satellite (SV) 16, a group of tailbouys 18, 20, 22, and 24, a reference link 26, a reference GPS downlink 28, a ship GPS downlink 30, a tailbuoy GPS downlink 32, and a group of tailbuoy VHF radio links 34, 36, 38, and 40. Tailbuoy 18 has a sonic cannon that emits a shockwave 42 that impacts on seafloor bottom 44. Reflected sound waves 46 are recorded by the tailbuoys 18, 20, 22, and 24. Data collected from reflected sound waves 46 and raw pseudo-range (PR) information is reported back to main system 12, together with a signal time-marking when the sonic cannon fired, over radio link 34. A compact message record (CMR) format is used by the tailbuoys to efficiently communicate data in the speed restricted and time competitive environment created here. The CMR is detailed below.

Figure 2:
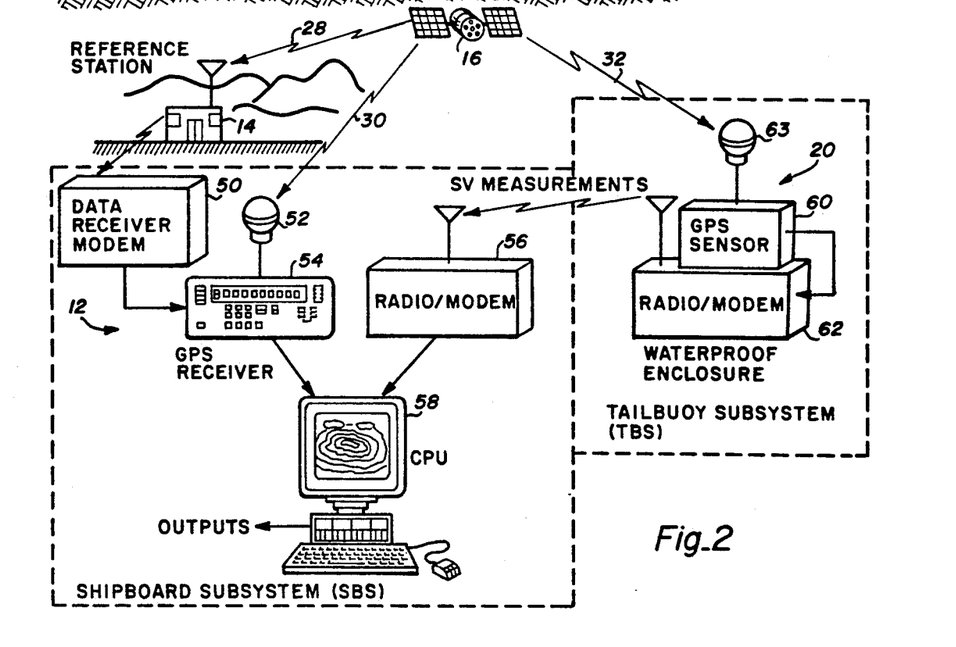

FIG. 2 shows that main system 12 comprises a data receiver modem 50, an antenna 52, a GPS receiver 54, a radio/modem 56, and a microcomputer system (CPU) 58. Tailbuoy 20, which is representative of all the tailbuoys, has a GPS sensor 60, a radio/modem 62, and a tailbuoy antenna 63. Since the tailbuoys are typically subjected to rough seas that can cause them to roll, a gimbal is provided on antenna 63 to keep the main reception lobe pointing in a consistent direction. Weather and corrosion are a major problem at sea too, so the gimbal mechanism, at least, will have a longer life and better operation if the entire antenna is covered by a radome. The construction of gimbals compatible with use at sea and radomes for satellite antennas are well-known, so further explanation here is not necessary.

Figure 3:
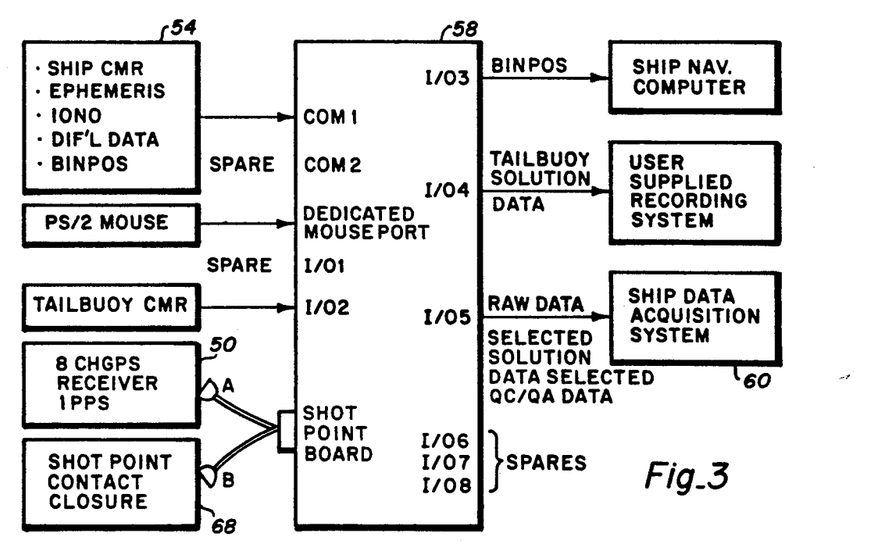

FIG. 3 diagrams the data I/O for CPU 58. GPS receiver 54 outputs a ship CMR (Compact Measurement Record), ephemeris data, ionospheric correction data, differential correction data (if supplied), and BINPOS (BINary POSition) data from GPS receiver itself, to port COM-1. A mouse connects to a dedicated port, and this can alternatively be a trackball. A trackball may be preferred for use on ships that roll at sea. A shot-point board is in add-on board that plugs into CPU 58. Preferably, CPU 58 is an "IBM-compatible" personal computer having an Intel 80386 microprocessor and the Microsoft MS-DOS or IBM PS/2 operating system. A Compaq Computer model 386 gives acceptable results. The shot-point board provides I/O interfacing for GPS receiver 50 and a shot-point contact closure 68 ultimately sourced from tailbuoy 18. Outputs from CPU 58 I/O ports 3-5 are BINPOS to the ship's navigational computer, tailbuoy solution data for user equipment, and raw measurement data for recording on a ship data acquisition system. Selected solution data and quality control/quality assurance (QC/QA) data is also available.

System Overview

CPU 58 calculates real-time range domain based separation vectors between the tailbuoys and ship. Pseudo-ranges (PRs) are optimally filtered using integrated Doppler. A computed weighted-least-squares solution is based on measured signal-to-noise-ratio (SNR), the duration of continuous tracking on each satellite, satellite geometry, and the expected level of correlated errors in each pseudo range. System 10 has a basic five meter relative position accuracy. Three tailbuoys can be processed per six second epoch. The radio communications link has a six kilometer range. The tailbuoy CPS receiver collects raw SV data and, compresses it into the CMR to reduce data packet length. All calculations are performed on the shipboard CPU. This provides for high accuracy calculations, and allows for quality control/quality assurance measure calculations and display. All raw data is stored for post mission analysis.

Quality Control/Quality Assurance

Real-time visual indicators to operators show the approximate quality of satellite data used in the position solutions. The nature of this display allows a user to immediately determine if data should be recollected. The indicators are ellipses drawn around each tailbuoy and ship icon on a user display (see FIG. 14). The ellipses are referred to as "error ellipses", since they provide a statistical indication of the expected solution error.

System 10 tracks the real-time positions and velocities of the ship and the three tailbuoys using the range domain DGPS technique. Five meter, one sigma ($\sigma$), accuracy of the relative solution between the ship and tailbuoy is possible, assuming an HDOP of 2.5 or less. Ten kilometer radio range from tailbuoy to ship is practical, assuming 20 meter antenna height on ship and three meter antenna heights on the tailbuoys. System 10 calculates an overdetermined solution when more than four healthy satellites are co-visible between the tailbuoy and ship, or three if a constrained altitude solution is selected. Update rates do not usually exceed six seconds for three tailbuoys with a 1200 baud radio communication link, assuming a worst case 1400-bit long message with eight satellites. The capture of a contact closure (shot point firing) is typically better than one millisecond UTC. Solution data is preferably de-skewed to the contact closure event. The following data is output to the ship's data acquisition system: receiver-generated BINary POSition data (BINPOS); tailbuoy solution—relative position to ship at shot point time; ship position; all raw data used in computation of ship and tailbuoy position including; compact measurement records for the tailbuoys; compact measurement records for the ship; ephemeris and ionospheric correction data for the ship; differential correction data for the ship; selected solution outputs; ship and tailbuoy solution, quality control and quality assurance measures. (statistics and over-determined solution data);

TBTRACK

TBTRACK is an application program that preferably installs itself on an "IBM-compatible" personal microcomputer's "C:" drive (hard disk). TBTRACK creates a directory tree (these terms will be familiar to IBM PC and Microsoft MSDOS users) that starts at the root directory

```
(C: ),e.g.,:
    TBTRACK
        CHARTS
        MWORLDS0
            MWORLDSS0.A01
        CHARTHDR
        MWORLDS0.HDR
        DCCHARTS
        ARCHIVE
        TEXT
```

TBTRACK is the directory that contains the TBTRACK program itself and its support files. It is from this directory that TBTRACK is executed. The CHARTS directory contains sub-directories that contain chart files. A program disk for TBTRACK preferably installs a chart file for the entire world in a sub-directory under CHARTS, called MWORLDSS0. Any additional charts installed in the system must have a directory created for them here.

MWORLDSO is a chart directory that TBTRACK creates at system installation.

The CHARTHDR directory contains "header" files for all of the charts that have a directory under CHARTS. These "header" files contain information about the charts in the CHARTS directory. A single header file for the MWORLDSO world chart is provided and installed by TBTRACK at install time. Any additional charts installed in the system have their corresponding header files placed here.

DCCHARTS is a directory that is used as a scanned chart disk file cache. As sections of a chart are decompressed, they are typically stored in this directory. The maximum amount of disk space that is taken by this cache is specified when running an initial setup program, VSETUp. A CaChe level is used such that when TBTRACK is requested to display a section of a chart it checks in the cache first, to see if a chart section exists in a decompressed form. If it does, it is simply read from the cache and displayed. If it does not exist, a compressed file is retrieved, decompressed, stored in a cache directory, and then displayed. If the cache directory becomes full, TBTRACK will erase the oldest chart section from the cache. It then saves the new chart section in the cache. If the disk space taken by this "cache" is needed for any reason other than TBTRACK's use, the contents may simply be deleted. TBTRACK will recreate cache files when necessary.

The ARCHIVE directory allows TBTRACK to archive ship position solution data. This data is used for tracking session reruns.

The TEXT directory archives ship report data in a text format that is easily readable.

Figure 4:
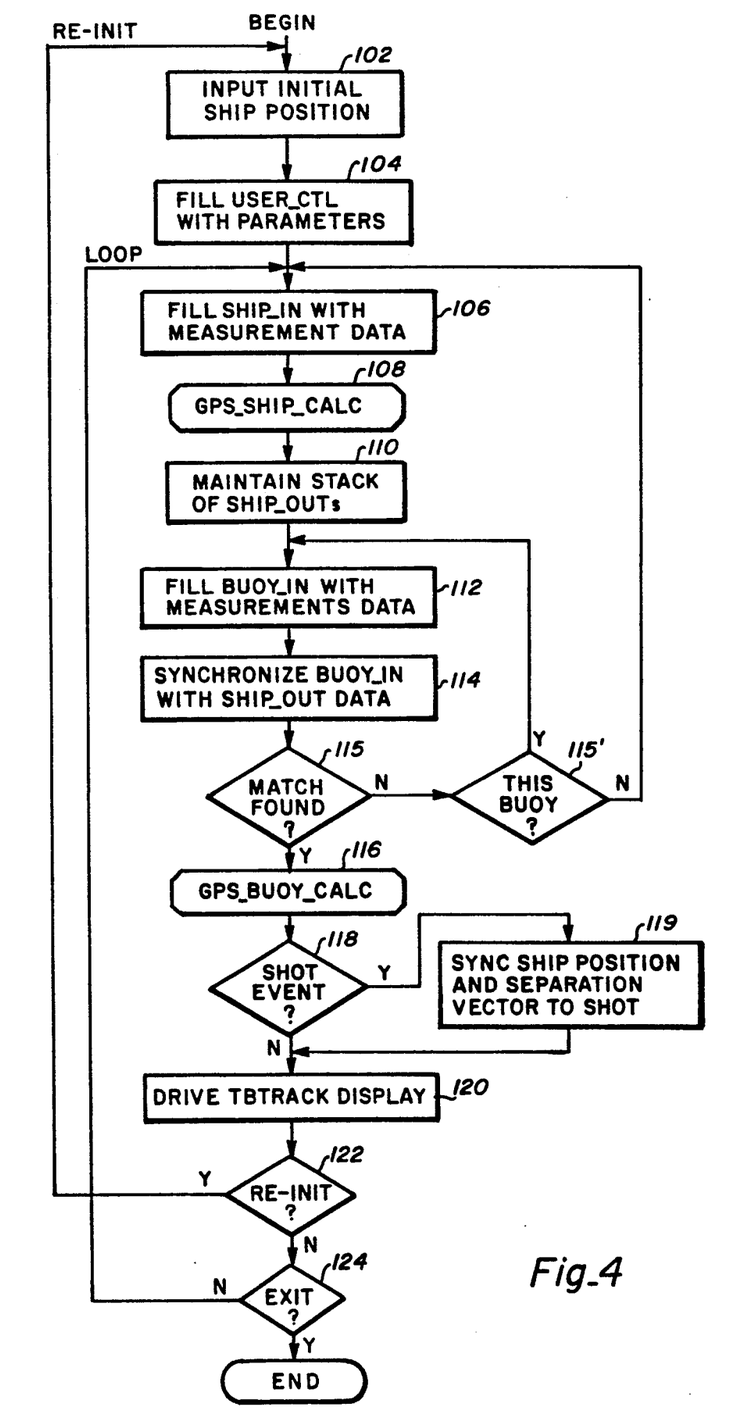

FIG. 4 is a top level flowchart for a computer-implemented process 100. Process 100 is referred to herein by its CPU 58 filename, TBTRACK. Step 102 allows a user to input basic information via the mouse and keyboard. Basic operating parameters are loaded in file USER_CTL in step 104. Raw data measurements from various GPS and radio receivers fill the data input requirements for the display and position/velocity solutions in step 106. Step 106 calls GPS_SHIP_CALC as a subroutine to compute the ship's position and velocity using the data made available in SHIP_IN (step 106). A queue, or stack, of time-tagged ship GPS data and solutions are assembled in step 110. Twelve distinct periods are maintained. Similar to step 106, BUOY_IN collects data necessary for the tailbuoy GPS solutions and display in step 112. The available tailbuoy raw data are then matched, using time-tags, with available ship solutions in step 114. In step 115, a test is made to see if a match can be found, if not, step 115' decides if the current tailbuoy and ship solution stet will provide a match, or if a whole new set is collected. If a match is found, the time is spent to convert the raw tailbuoy data into final solutions in step 116. Step 118 checks to see if a sonic canon has been fired (shot event). If yes, step 119 synchronizes ship position and separation vectors (to the tailbuoys) to the shot. In any event, step 120 updates (drives) the TBTRACK display on the user screen of CPU 58. Step 122 tests whether or not a user has input a reset via the mouse of CPU 58. If so, control flow returns to step 102. Step 124 decides whether or not to loop to step 106 to repeat the above sequence, or to end.

Figure 5:
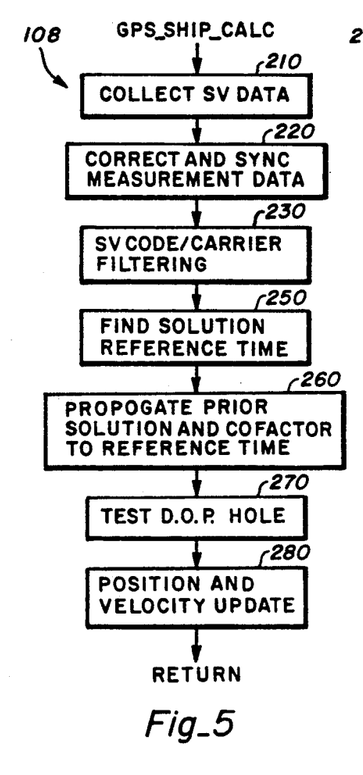

FIG. 5 flowcharts the GPS_SHIP_CALC subroutine called in step 108 of FIG. 4. Step 210 collects space vehicle (SV) data in the form of raw pseudo-ranges. This measurement data is corrected and time synchronized in step 220. The raw data is filtered in step 230 and statistical information about the quality of the data is obtained. A solution reference time is selected in step 250. The previous solution is carried-forward (propagated) with its associated cofactor matrix to the selected reference time in step 260. Propagated solutions are used to provide information bridging across time periods that would otherwise have missing solutions because the current raw data input has been judged to be insufficient or unreliable. In step 360, which is not used in an alternative embodiment, a test is made using the propagated cofactor matrix for solution degradation caused by the loss of contact with one or more SVs. (Such a loss can occur on individual tailbuoys or the ship itself as the sea rolls and the respective GPS receiving antennas swing around, for example.) DOP holes are SV configurations (positions in the sky) that create problems in SV navigation systems. These problems occur because of poor geometric SV locations (referred to also as bad geometry). Step 280 updates the position and velocity solutions and makes them available. GPS_SHIP_CALC 108 then returns.

Figure 6:
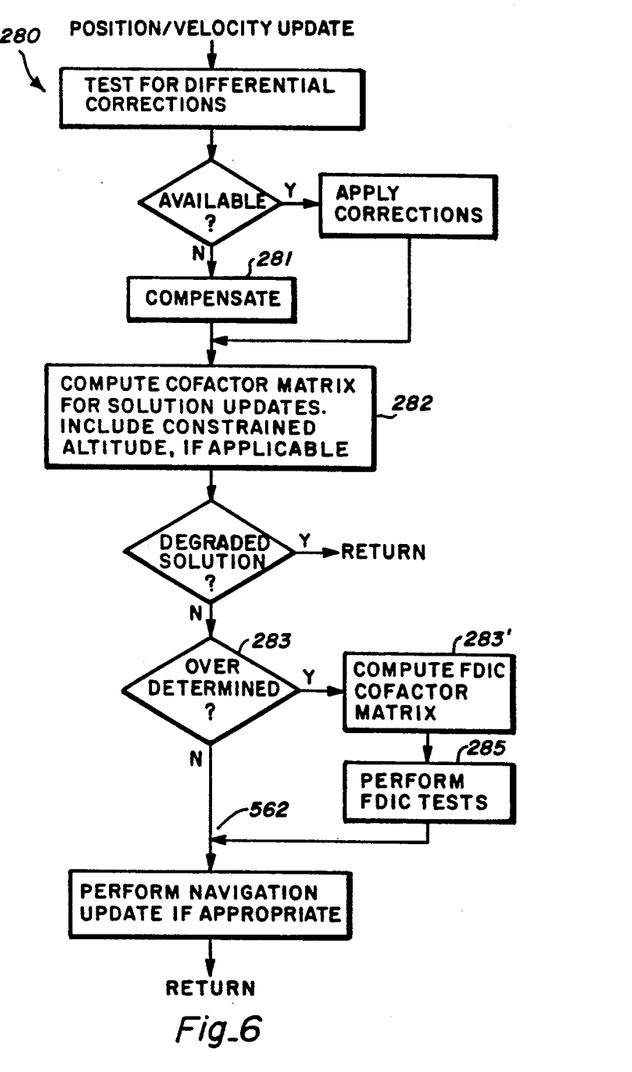

FIG. 6 flowcharts position and velocity update subroutine 280. The ionosphere and troposphere can disturb raw pseudo-range information, and step 281 uses the elevation, azimuth, and other data about each SV to compute and apply a correction factor to each measurement. The cofactor matrix is then computed in step 282. If more than four or more than three SVs in a constrained altitude mode are supplying acceptable information, then step 283 will branch to step 283' to compute a separate cofactor matrix for FDIC. When three SVs only are supplying acceptable data, the fact that the ship and tailbuoys must have altitudes approximating mean sea level (MSL) is used in a constrained altitude solution in step 284. Fault detection, isolation, and correction (FDIC) tests are run in step 285 and the subroutine 280 returns.

The advantages of a navigation system that can monitor its own integrity are obvious. (See, Mark A. Sturza, "Navigation System Integrity Monitoring Using Redundant Measurements," NAVIGATION: Journal of The Institute of Navigation", Vol. 35, No. 4, Winter 1988-89.) Redundant measurements allow fault detection that stops errors before they have a chance to corrupt the outputs. Sturza presents an excellent background for the reader and gives two examples of systems with fault detection, 1) a skewed axis strapdown inertial navigation system, and 2) a GPS navigation set. Sturza also discloses a fault identification algorithm. The present invention not only detects and isolates faults, but makes use of an isolation reliability test, and then corrects input sources. In addition, the statistical weightings given to the measurement data are computed dynamically, while Sturza makes use of fixed weightings.

Figure 7:
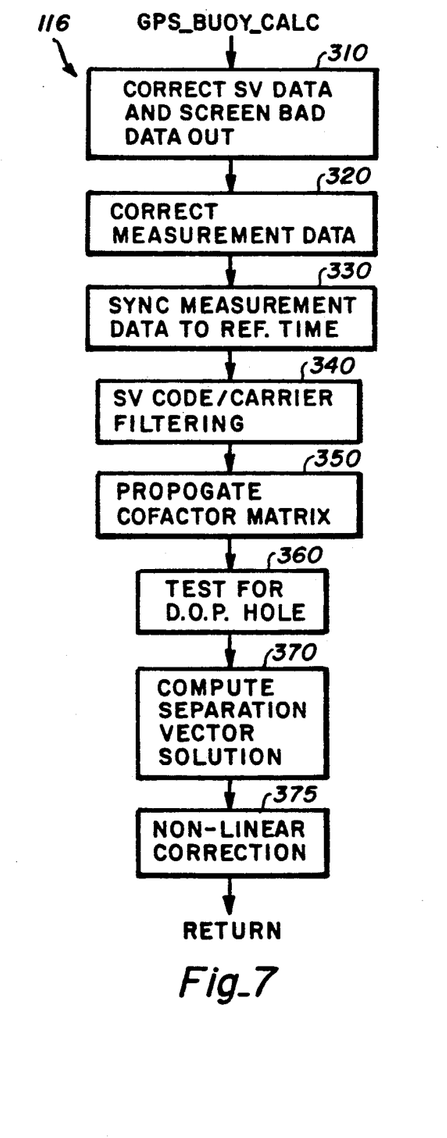

FIG. 7 flowcharts the GPS_BUOY_CALC subroutine. In step 310, SV measurement data is collected and tested to see if the data is acceptable. In step 320, SV measurement data is corrected for receiver clock rollover and SV clock error. In step 330, buoy measurements are synchronized to the reference time, calculated by GPS_SHIP_CALC. In step 340, SV Code/Carrier Filtering is used to produce a current, optimally smoothed pseudo-range (PR) for each SV. The filtering is designed to access stored measurement ionospheric correction data from each SV. This data is used to compensate for the ionospheric dispersion between the code and carrier information. In step 350, the cofactor matrix is propagated to the reference time. The purpose of the position and velocity cofactor matrices is to measure the amount of uncertainty in the previous calculations. In step 360, which is not used in an alternative embodiment, a test for DOP holes is initialized. DOP holes are SV configurations (positions in the sky) that create problems in SV navigation systems. These problems occur because of poor geometric SV locations (referred to also as bad geometry). The advantage of computing a cofactor matrix is that it identifies and screens out DOP holes which can create problems to navigators. Once a DOP hole is identified, the operator is informed of this by the lack of new position updates. In step 370, after the ship's position is updated, a computation of separation vectors is performed. Separation vectors represent the vectors from buoy to ship. In step 375, since the lines-of-sight from the ship and buoy to each SV are not truly parallel, a nonlinear correction is performed. This non-linear correction enables the program to reduce errors to a minimum.

Figure 8:
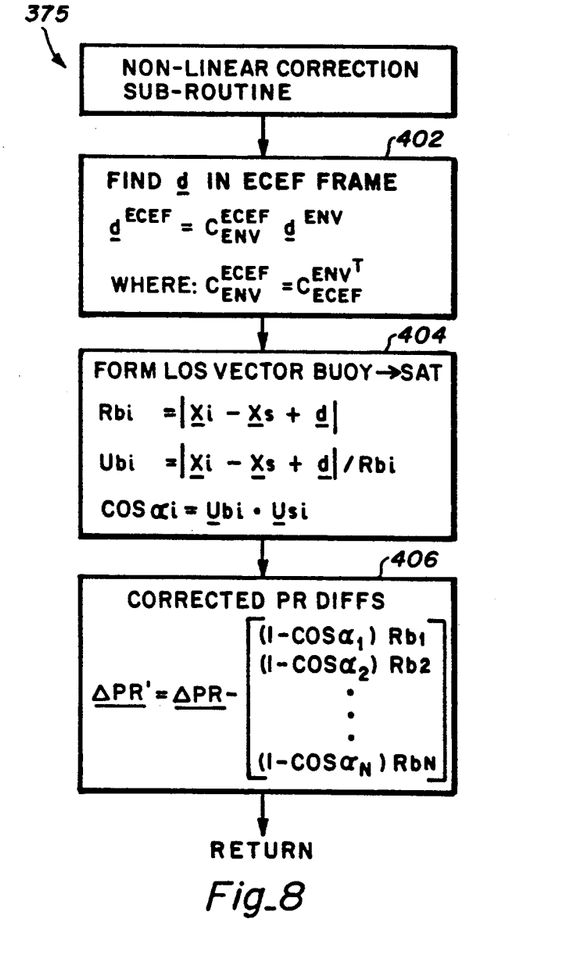

FIG. 8 flowcharts the nonlinear-correction subroutine where delta-PRs ($\Delta$PR) are non-linearly corrected to produce corrected delta-PRs ($\Delta$PR') such that:

$$\Delta PR' = \Delta PR - \begin{vmatrix} (1 - \cos\alpha_1) & Rb_1 \\ (1 - \cos\alpha_2) & Rb_2 \\ \ldots & \\ (1 - \cos\alpha_n) & Rb_n \end{vmatrix}$$

where d is found in the ECEF frame by:

$$d^{ECEF} = C_{ENV}^{ECEF} \bullet d^{ENU};$$
$$Rb_i = |x_i - x_s + d|;$$
$$ub_i = |x_i - x_s + d| / Rb_i; \text{ and}$$
$$\cos\alpha_i = ub_i \cdot ub_s.$$

Figure 9:
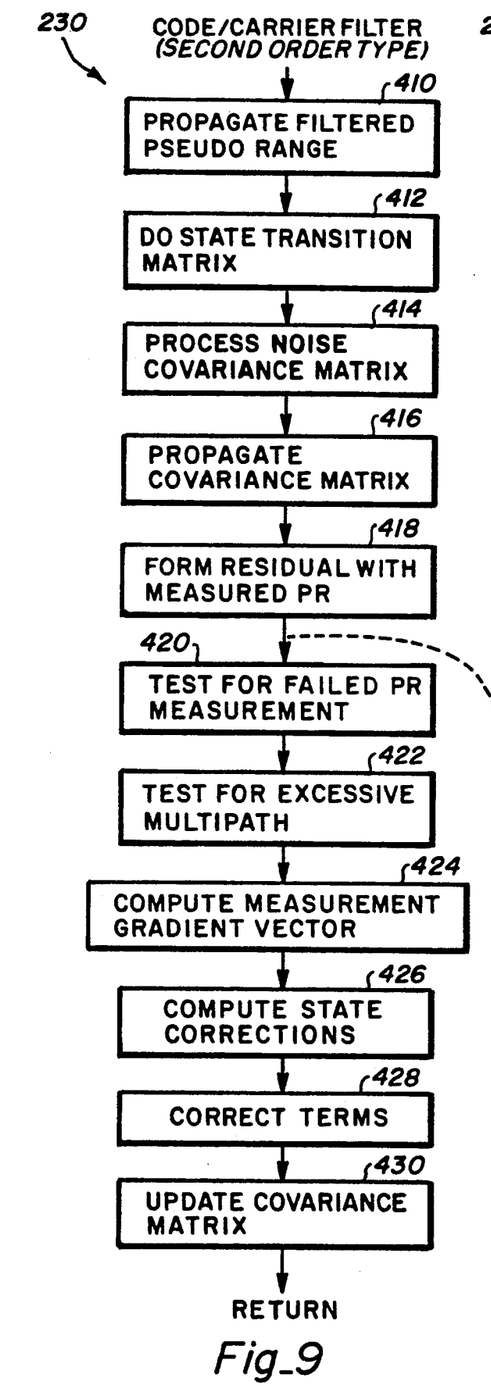

FIG. 9 flowcharts a part of the first embodiment of the present invention which is second-order space vehicle (SV) code/carrier filtering correction subroutine 230. Filtered pseudo ranges are propagated in step 410 by computing:

$$\widehat{PR}_k = \widehat{PR}_{k-1} + (ID_k - ID_{k-1}) + 2(\delta\widehat{Ri}^m_k - \delta Ri^m_{k-1}) + 2 \delta Ri_{k-1} \Delta t$$

Step 412 computes the state transition matrix:

$$\Phi = \begin{vmatrix} 1 & 2\Delta t \\ 0 & 0 \end{vmatrix}$$

Step 414 computes the process noise covariance matrix:

$$Q_{k-1} = \begin{vmatrix} 0 & 0 \\ 0 & q_2 \end{vmatrix}$$

where $q_2 = (5 \cdot 10^{-6} \cdot \delta Ri^m_{k-1})^2 \cdot \Delta t$.

Next, in step 416, the covariance matrix is propagated by:

$$P_k = \Phi P_{k-1} \Phi + Q_{k-1}.$$

Step 418 forms residuals with the measured psuedo ranges:

$$PR_{res\ k} = PR^m_k - \widehat{PR}_k.$$

Failed psuedo range measurements are tested for in step 420:

$$res\_2 = PR_{res}^2$$

and if, res_2 > res²_max, updating is bypassed. Excessive multi-path conditions are tested for in step 422:

$$res\_ratio = res\_2/res\_var$$

and if, res_ratio > res_thresh, the update is bypassed by returning early. The measurement gradient vector is computed by:

$$h^T = |1\ 0\ 1|$$

and computing Kalman gain vector, k. State corrections are computed next, in step 426, in:

$$\begin{vmatrix} \Delta\widehat{PR} \\ \Delta\widehat{\delta R_i} \\ \Delta\widehat{\delta PR_m} \end{vmatrix} = k\ PR_{res}.$$

Then, in step 428, $\widehat{PR}$, $\widehat{\delta R_i}$, and $\delta\widehat{PR}_m$ are corrected:

$$\widehat{PR} = \widehat{PR} + \Delta\widehat{PR}$$
$$\widehat{\delta R_i} = \widehat{\delta R_i} + \Delta\widehat{\delta R_i}$$

-continued
$$\delta\hat{PR}_m = \delta\hat{PR}_m + \Delta\delta\hat{PR}_m$$

Finally, in step 430, the covariance matrix is updated:

$$P = (I - k\ h^T) \cdot P;$$

and subroutine 230 returns.

Figure 10:
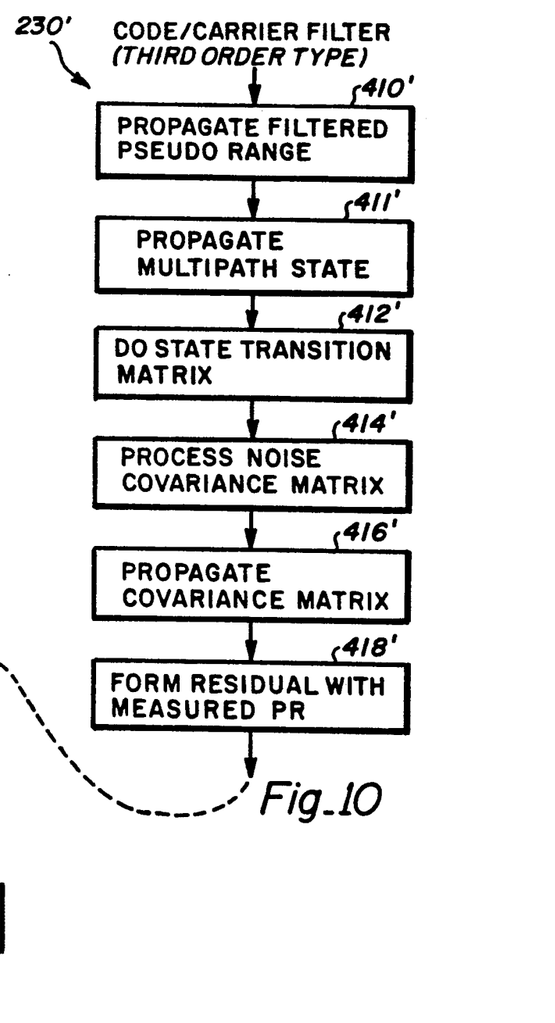

FIG. 10 flowcharts a second embodiment of the present invention and is a third-order filter that combines to form SV code/carrier filtering correction subroutine 230'. This third order filter subroutine 230' substitutes steps 410 through 418, described above, with steps 410' through 418' (and it adds 411' between 410' and 412'). Filtered pseudo ranges are propagated in step 410' (which is the same as step 410) by computing:

$$\hat{PR}_k = \hat{PR}_{k-1} + (ID_k - ID_{k-1}) + 2(\delta Ri^m_k - \delta Ri^m_{k-1}) - \delta Ri^m_{k-1}) + 2\ \delta Ri_{k-1}\ \delta t;$$

where:
ID (integrated Doppler)
$\Delta Ri^m$ (modelled ionospheric delay)
$\Delta Ri$ estimated ionospheric rate error).
Step 411' propagates the multi-path state:

$$\delta\hat{PR}_{m\ k} = (1 - \beta\Delta t)\ \delta\hat{PR}_{mk-1};$$

where, $b = 1/T_m$, $T_m$ is the multi-path time constant. Step 412' computes the state transition matrix:

$$\Phi = \begin{vmatrix} 1 & 2\Delta t & 0 \\ 0 & 1 & 0 \\ 0 & 0 & 1 - \beta\Delta t \end{vmatrix}.$$

Step 414' computes the process noise covariance matrix:

$$Q_{k-1} = \begin{vmatrix} 0 & 0 & 0 \\ 0 & q_2 & 0 \\ 0 & 0 & q_3 \end{vmatrix}$$

where: $q_2 = (5 \cdot 10^{-6} \cdot \delta Ri^m_{k-1})^2 \cdot \Delta t$;

$q_3 = 2\ \beta\sigma_m^2$.

Next, in step 416', as in step 416, the covariance matrix is propagated by:

$$P_k = \Phi P_{k-1}\Phi + Q_{k-1}.$$

Step 418' forms residuals with the measured pseudo ranges:

$$PR_{res\ k} = PR^m_k - \hat{PR}_k - \delta\hat{PR}_{mk}.$$

The use of the third order code/carrier filter in subroutine 230' improves solution robustness in multi-path rich environments, since it directly estimates and removes any substantial multi-path present in pseudo range measurements.

Figure 11:
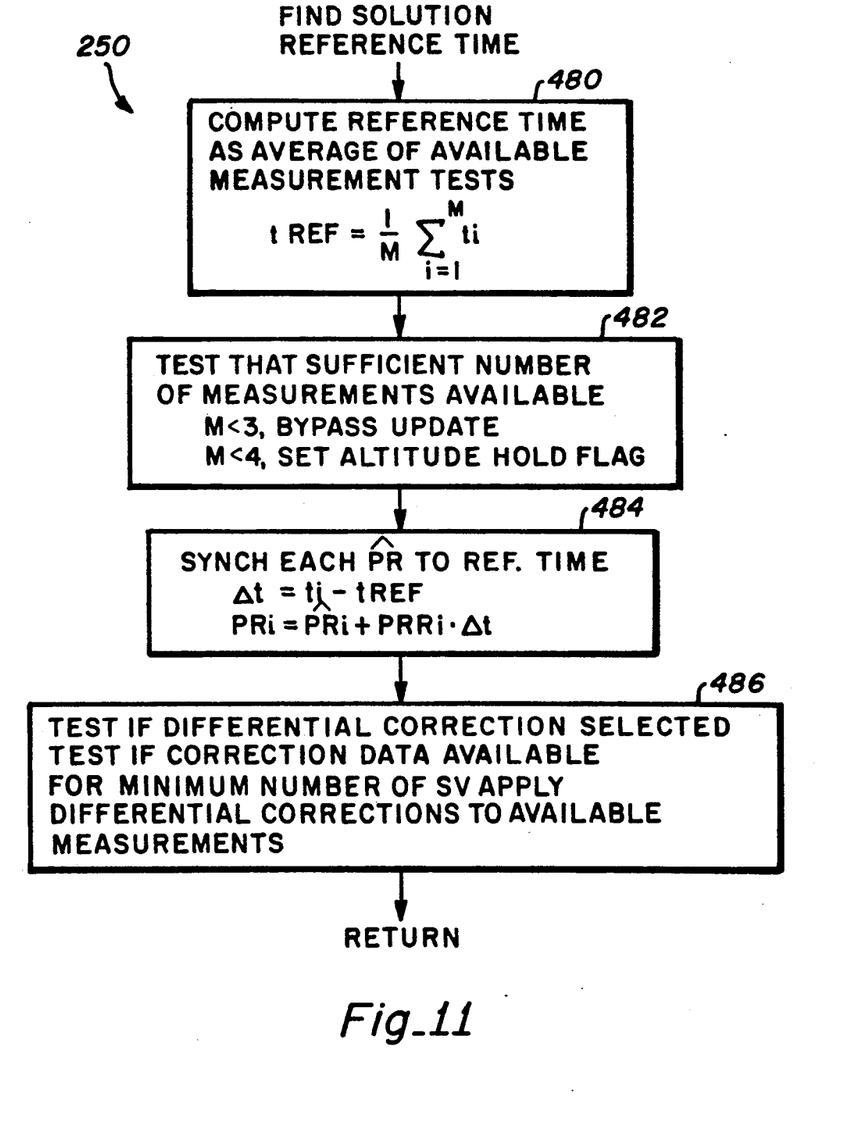

FIG. 11 flowcharts subroutine 250. Finding a solution reference time begins with step 480, where the reference time is computed as the average of available measurement tests:

$$t_{ref} = \frac{1}{m} \sum_{i=1}^{m} t_i.$$

Step 482 tests to see that a sufficient number of measurements are available. If less than three, the update is bypassed. If less than four, an altitude hold flag is set to enable a constrained altitude solution. In step 484, each filtered pseudo range is synchronized to the reference time. Subroutine 250 then returns.

Figure 12:
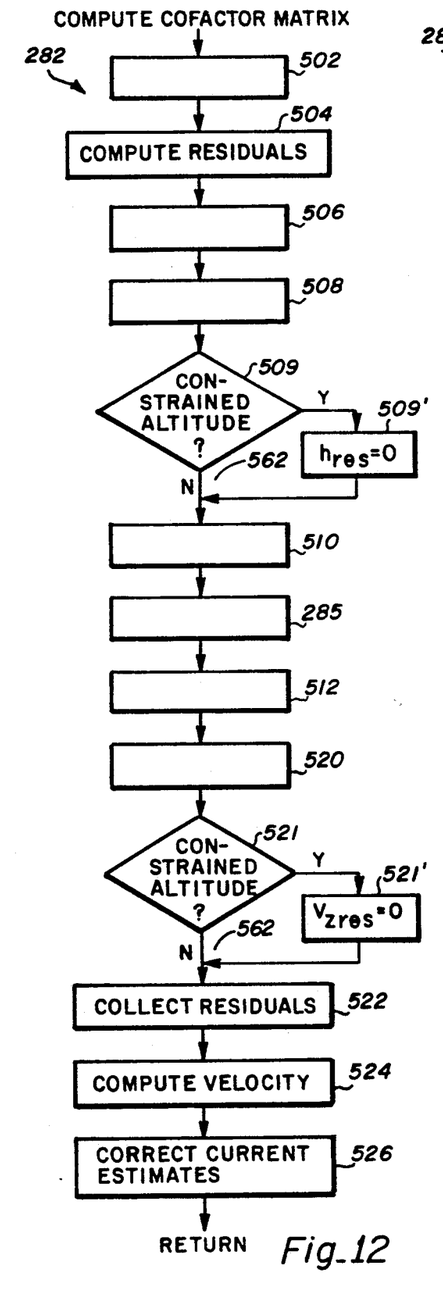

FIG. 12 flowcharts subroutine 282 for computing the cofactor matrix $(H^T R^{-1} H)^{-1}$ and performing a navigation update. In step 502, position is:

$$H = \begin{vmatrix} U_1^T & & & 1 \\ U_2^T & & & 1 \\ & \cdots & & \\ U_m^T & & & 1 \\ 001 & & & 0 \end{vmatrix} \leftarrow \text{if constrained altitude selected.}$$

In step 504, the residuals are:

$$R^{-1} = \begin{vmatrix} 1/\sigma_1^2 & & & & \\ & 1/\sigma_2^2 & & & \\ & & \cdots & & \\ & & & 1/\sigma_m^2 & \\ & & & & 1/\sigma_h^2 \end{vmatrix} \leftarrow \text{if constrained altitude selected.}$$

The residuals for each SV ("i") pseudo range are:

$$PR_{res\ i} = PR_i - \hat{PR}_i.$$

Step 508 computes:

$$PR_{res} = \begin{vmatrix} PR_{res\ 1} \\ PR_{res\ 2} \\ \cdots \\ PR_{res\ m} \end{vmatrix}.$$

If the constrained altitude solution is engaged, then step 509:

$$h_{res} = 0.$$

Step 510 computes:

$$\Delta\hat{p}^{ENU} = H^* \left( \frac{PR_{res}}{h_{res}} \right)$$

where, $(H^T R^{-1} H)^{-1} H^T R^{-1}$.

Fault detection, isolation and correction (FDIC) is called in step 285. Then, if the FDIC process results in a sufficient number of "healthy" satellites, the current state estimates are corrected in step 512:

$$\Delta\hat{p}^{ECEF} = C^{ECEF}_{ENU} \cdot \Delta\hat{p}^{ENU};$$
$$p = p - \Delta p.$$

Velocity is then updated, beginning with step 520:

$$PRR_{res\ i} = PRR_i{}^m - \hat{PRR}_i.$$

If the constrained altitude solution is engaged, then step 521:

$$h_{res} = 0.$$

Step 522 corrects the residuals:

$$PRR_{res} = \begin{vmatrix} PRR_{res\ 1} \\ PRR_{res\ 2} \\ \ldots \\ PRR_{res\ m} \end{vmatrix}.$$

Velocity is computed in step 524 with:

$$\Delta \hat{v}^{ENU} = H^* \left( \frac{PRR_{res}}{V_{zres}} \right) \leftarrow \text{if constrained altitude selected.}$$

And then before returning, step 520 is used to correct the current state estimates:

$$\hat{v}_e = \hat{v}_e - \Delta \hat{v}_1$$

$$\hat{v}_n = \hat{v}_n - \Delta \hat{v}_2.$$

Figure 13:
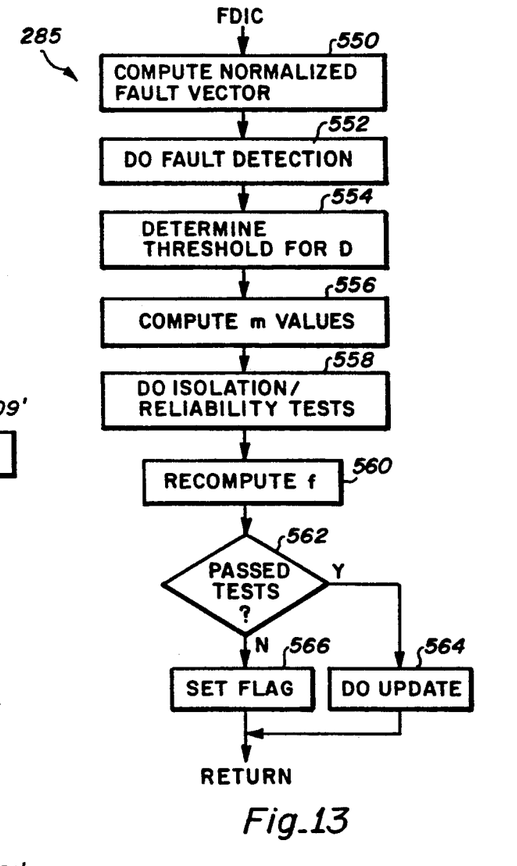

FIG. 13 flowcharts the fault detection isolation and correction (FDIC) subroutine 285. A normalized fault vector is computed in step 550, by:

$$f = S'z$$
$$S' = R^{-\frac{1}{2}} (I - HH^*)$$
$$H^* = (H^T R^{-1} H)^{-1} H^T R^{-1}$$

Fault detection in step 552 comprises:

$$D = f^T \cdot f.$$

Step 554 determines thresholds for "D" based on the following table:

| P (False Rejection) | CHI-SQUARE THRESHOLD TABLE Number of Redundant Measurements | | | | | | | | |
|---|---|---|---|---|---|---|---|---|---|
| | 1 | 2 | 3 | 4 | 5 | 6 | 7 | 8 | 9 |
| 10.00% | 2.71 | 4.61 | 6.2 | 7.78 | 9.24 | 10.64 | 12.02 | 13.36 | 14.68 |
| 5.00% | 3.84 | 5.99 | 7.81 | 9.49 | 11.07 | 12.59 | 14.07 | 15.51 | 16.92 |
| 2.50% | 5.02 | 7.38 | 9.35 | 11.14 | 12.83 | 14.45 | 16.01 | 17.53 | 19.02 |
| 1.00% | 6.63 | 9.21 | 11.34 | 13.28 | 15.09 | 16.81 | 18.48 | 20.09 | 21.67 |
| 0.50% | 7.88 | 10.60 | 12.84 | 14.86 | 16.75 | 18.55 | 20.28 | 21.96 | 23.59 |
| 0.10% | 10.83 | 13.82 | 16.27 | 18.47 | 20.52 | 22.46 | 24.32 | 26.13 | 27.88 |
| 0.05% | 12.12 | 15.20 | 17.73 | 20.00 | 22.11 | 24.10 | 26.02 | 27.87 | 29.67 |
| 0.01% | 15.14 | 18.42 | 21.11 | 23.51 | 25.75 | 27.86 | 29.88 | 31.83 | 33.72 |

Given that a fault is detected, the "m" values are computed in step 556 by:

$$f_i^2 / S_{ii} \cdot R_i + i.$$

These "m" values are used for fault iSOlation, as discussed in the Sturza article, supra. Generally, the largest value indicates the faulty satellite, however, the test is modified and extended to include an isolation reliability test. The test examines the largest and next largest values, and computes a ratio of the conditional probability that each satellite has failed. Only if this ratio exceeds a specified threshold will the isolation be considered successful. If the isolation is not determined to be reliable by this test, the current update will be bypassed. The value of f is recomputed for the reduced dimension and failure detection is repeated in step 560. In step 562, if the FDIC checks pass, an update is done in step 564. The subroutine 285 then returns.

Alternative Embodiments

The above respective relative position and velocity calculations can alternatively comprise both a Kalman filter and an interacting weighted-least-squares method, such that the Kalman filter-derived uncertainty levels are used in a weighing of each of a number of satellite measurements.

The above FDIC tests can alternatively comprise dynamic weighing of information based on all conditions affecting satellite viability and measurement quality. The FDIC tests would then also comprise an isolation reliability test, which is based on computing conditional probability ratios, such that any defective satellites are removed from a final position and/or velocity solution.

Figure 14:
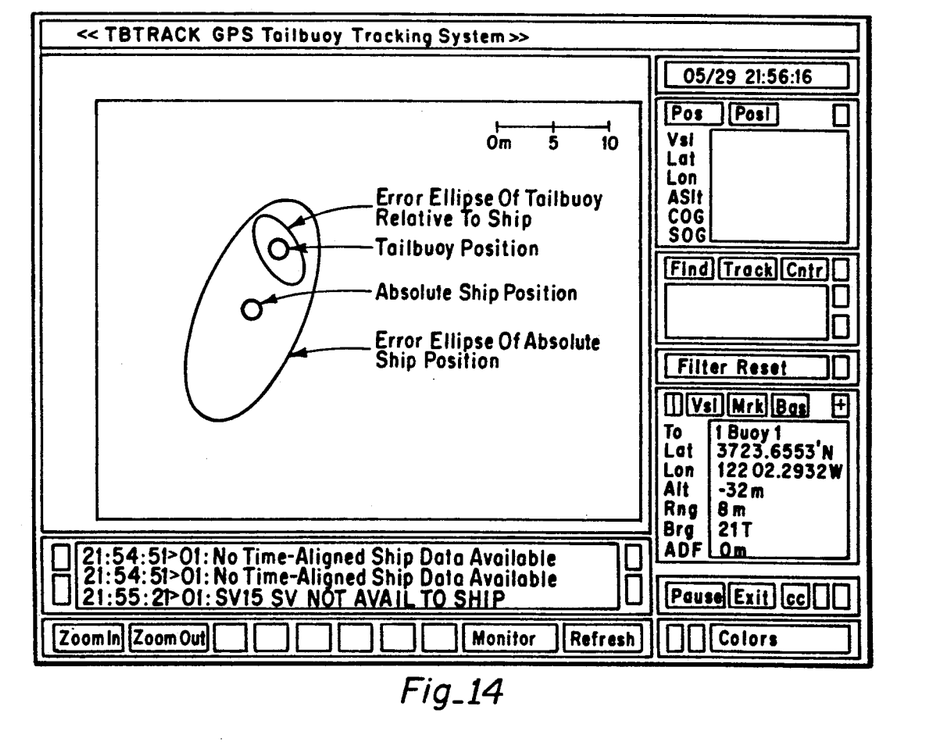

FIG. 14 illustrates a typical screen display presented to a user of the system of FIG. 1. CPU 58 can be configured with a variety of digital maps having various scales and selected geographic areas. Any one of these maps may be displayed on entry of a operator command, or maps can be automatically displayed, based on a selected vessel's position. A world coastline database could be included for a global view of ship locations and for ships operating in areas for which charts are not available. Full roam, zoom, and centering capability is preferred. CPU 58 uses an Intel 80386-based IBM-compatible computer with a 80387 math co-processor, mouse, VGA graphics board, and monitor (to get the required map resolution). Major functions provided by CPU 58 include navigation status data, operator entered ship identity and database information, range and bearing between vessels and geographic locations, route graphic and location icon functions, map manipulation, data archiving, and current date and time.

TBTRACK operation and data display is initiated through use of a VSETUP program. Ten screens are presented to the operator. If no editing is done, TBTRACK starts up in a default operating mode. On a shutdown of TBTRACK, screen data is updated or created, and will contain the current configuration of TBTRACK.

Parameters that can be modified by a user include, current color settings, data table display choice, current ship selections, parameters for the tailbuoy solution algorithm, and map units.

A "FAULT ISOLATED" message will appear when a fault is detected and has been isolated to a particular satellite. Error messages can be scrolled through a window just below the main display. The most recent message is highlighted, and previous messages (up to a maximum of 1000) can be scrolled up into view by using cursor keys provided. CPU 58 does the majority of its user interface via on-screen menus and buttons that are selected with a mouse. Mouse functions include roam, zoom, and centering of the map; selection of a ship display for position, course, speed, etc.; place, move, or erase symbols and line segments on the map; change the color of symbols or lines to be drawn; and change the color of most of the objects displayed on the screen to suit user preference.

In addition to stored maps, a graphics functions allows users to enter basic overlays, such as harbor approaches, routes, and nav-aid locations. The system allows "scratch-pad" graphic entries for objects such as ship route lines and route destination symbols. This second overlay level is erasable and displayed at the users discretion.

TBTRACK has a large number of tracking utility "tables" that can be called up from a main menu located at the lower right of the screen, see FIG. 14. To select a table, mouse buttons are clicked when the on-screen pointer is at an on-screen scroll button (the button containing an arrow with an arrow head at the top and at the bottom). The scroll buttons on the main menu table are manipulated until the name of the desired table is visible in the main menu window. When the name of the desired table is visible, use the left mouse button to press the checkmark button (next to the scroll button). The selected table is displayed in an area above the main menu. If there is not enough room for the selected table, TBTRACK beeps, and the current table stays put. Four tracking utility tables appear at the right of the CRT display. The lower right hand table indicates, for example, ship location and the range and bearing to the selected objects. In an upper right hand table, the location of the ship is highlighted in the third table (Tailbuoy 1) is provided.

System Menu

A system menu contains buttons to control TBTRACK at the system level. A "pause" button holds the display when archived data is being rerun. An "exit" button causes a confirmation window to be displayed, which asks whether or not the user really wants to exit TBTRACK If yes, TBTRACK is exited. A "CC" button brings up a communications controller (CC) display. When the CC display is active, none of the incoming reports from the tailbuoys are processed. An "M" button displays a scrollable error message window. When not selected, the window will automatically appear whenever a new error message is received. Error ellipses are always displayed for the ship and tailbuoy solutions. Each error ellipse is centered about a current calculated position. The tailbuoy error ellipses preferably show the relative position solution error, while the ship error ellipses show the absolute ship's position solution error. (FIG. 14.) A "filter reset" button causes pseudo-range filters to be reset (specifically position history data is cleared), and the ship and tailbuoy solutions to be re-initialized.

Map Type

A map type table contains buttons to select a type of map to display in the map window. Only one type of map may be enabled at a time. All of the map displays are overlaid with latitude/longitude grids coordinated with the scale displayed. Each option is indicated in an appropriate tracking utility table: A "scanned" button makes TBTRACK use raster scanned maps from a map drawer. A "grid only" button drops coastline and raster scanned backdrop from the map window. Only the latitude-longitude grid is displayed.

Select Unit

A "select unit" function has a "vessel name" window that contains a scrollable list of all of the space vehicles in TBTRACK's database. The name of the "current ship" is highlighted here. When the text for any other TBTRACK function refers to the "current ship", it is referring to the ship highlighted in this particular window. The ship is assigned a number of zero, and tailbuoys are numbered 1,2,3, etc. The "names" are "ship", "buoy1", "buoy2", "buoy3", and so on.

A "scroll up/scroll down" pair of buttons with up and down arrows select the current ship. If the current ship selection "bar" (highlight) is scrolled out of the window, the entire list of vehicles is scrolled, and the new current ship is brought into the window and highlighted. If the bar is scrolled beyond the beginning of the list, the bar moves to the last ship. Similarly, if the bar is scrolled beyond the end of the list, the bar moves to the first ship. If the desired ship is visible in the window, it is not necessary to move the bar using the scroll buttons. Simply placing the mouse pointer on the desired ship and pressing the left button will make that ship the current ship.

A "find" button causes TBTRACK will pan, scroll, zoom out, and/or pan to find the current ship and display it at the center of the display screen. A "track" button locates the current ship and causes TBTRACK to keep the current ship on the screen. When the current ship approaches or crosses the edge of a map window, TBTRACK will pan and/or zoom as is necessary to keep the ship icon the display screen. A "center" button combines "track" and "center" functions, when selected this function causes TBTRACK to keep the current ship in view in the map window to keep it centered.

Colors

The colors of many of the items on the screen of FIG. 14 are selectable by the users. All of the color selections remain in effect, even though TBTRACK may have been restarted. A "scroll up/scroll down" pair of buttons are used to scroll a list of items whose colors can be changed. An "item name window" button lists the names of the items whose colors are changeable. A plurality of 16 color buttons are presented in a "colors" table. When selected, an item whose name appears in an "item name" window is set to the selected color.

Draw Lines

TBTRACK has a "scratch pad" ability to draw lines on a map. The lines are stored in a "lines" database, below. "Draw" enables the line drawing capability. When the mouse cursor comes within the map window, its shape is changed to an arrow. The first time a mouse button is pressed, when the cursor is in the map window while "draw" is enabled, a series of line segments is begun. Each subsequent click of the mouse plants an end point of each new line segment. The beginning points of each new line segment typically begins at the end point of the previous line segment. The colors of line segments are selected from the "colors" table. The color may be changed from segment to segment before the segment is drawn. "Rem" is used to erase line segments. The cursor is placed over a line segment in the map window, and when a mouse button is pressed, the line segment will be removed. If the shift button on the keyboard is being held down when the mouse button is pressed, the line segment and any contiguous segments forward and backward will also be erased. "Rset" (reset) begins a new set of segments during a drawing operation. "Latitude/longitude or range/bearing display" displays range and bearing from the previous point. When not selected, the latitude and longitude of the cursor are displayed. "Cursor position window" causes to be displayed the latitude and longitude represented at the cursor, or displays the range and bearing from a previous point, when line segments are being drawn.

Draw Symbols

"Put" enables a symbol drawing capability. When the cursor is brought into the map window, its shape will be that of the then currently selected symbol. Clicking a mouse button when the mouse is in the map window will paste shape on the map. The symbol is fixed geographically, and all symbols and their locations persist between successive runs of VTRACK. The color of the symbol is selected from the "colors" table. The color may be changed from symbol to symbol before the symbol is drawn. "Erase" will remove symbols in the map window. "Scroll" is used to scroll through the list of available symbols in the symbol database. "View icon window" causes the current symbol selected with the scroll button to show which color it will appear as in a map. "Latitude/longitude window" causes the latitude and longitude of the cursor to be displayed during drawing.

Position/Info

This is a window that displays measurement report information or the position and velocity for the current ship. A "Pos" button causes ship ID, latitude, longitude, course-over-ground and speed-over-ground to be displayed. A "PosI" (position information) button will display ship ID, position fix type, time of compact meaurement report (CMR), and a list of the satellites used in the solution(s). The fix type may be any one of the following:

GPS2D GPS constrained altitude ship and/or tailbuoy solution;
GPS3D GPS three-dimensional ship and/or tailbuoy solution;
DGPS2D differentially corrected constrained altitude ship solution;
DGPS3D differentially corrected three dimensional ship solution;
PROP propagated ship and/or tailbuoy solution; and
NONE for no solution generated.

The time of the CMR is not the time at which the ship was at the reported position, but the time at which TBTRACK received the report. "Data Window" contains the data described above.

Range Bearing

This table is a utility that allows users to view range and bearing data between a) one ship and another, b) a ship and the mouse cursor, and (c) a ship and the base position. "Vcl" causes the range and bearing window to display range and bearing data from the current ship to a ship listed at the top of the window. (See below.) Ships may be changed using the scroll button. "Scroll" is used to select which ship range and bearing will be determined. "Mrk" (mark) causes TBTRACK to present the range and bearing from the current ship to the mouse cursor when the mouse is within the map window. When the mouse cursor moves outside the map window, the range/bearing window is blanked.

Rerun

Data is archived to a directory under VTRACK main directory called "archive" (a default name). These files are used as a permanent archive of the reported data and as a rerun database. Files may be called up by users and replayed as if the data were coming-in in real-time. If VTRACK is placed into the rerun mode, all incoming ship reports are stored in the current archive files, will not be concurrently displayed on the screen. "Rerun" enables rerun mode and begins the reading of the currently selected rerun data file. "Rerun time window" is used by VTRACK to display the time of the rerun data. "Archive date/time window" shows the date and time of the beginning of the currently selected rerun file. A "scroll date/time" button is used to scroll through available rerun data files to select one for replay. A "speed window", a "slower" button, and a "faster" button control the speed at which archived data is rerun. The speed window contains a relative speed "ramp". There is also a white vertical cursor located at a point on the ramp. The cursor position (and hence the speed of the rerun) is adjusted by either selecting one of the buttons to either side of the ramp window or by simply pressing a mouse button when the cursor is at the desired location on the ramp. If the vertical white cursor is placed on top of the vertical line near the left-center of the ramp window, the rerun will take place at actual speed. If the cursor is placed to the right of this vertical line, the rerun plays faster than was actual speed. If the cursor is placed to the left of the vertical line, the rerun plays slower than actual speed.

VTRACK Map Manipulation Menu

Below the map window are buttons that manipulate the map display. "Zoom-in" brings the map in tighter by one level. "Bas" (base) causes VTRACK to display the range and bearing from the current ship to a base position. The base position is specified in the VSETUP program. A range/bearing window" displays all the range and bearing data. The data fields of this window are:

| To | object to which range and bearing are calculated; |
|----|---|
| Lat | the latitude of the object; |
| Lon | the longitude of the object; |
| Rng | range from the current ship to the object; and |
| Bng | true bearing from the current ship to the object. |

Show Chart

Scanned charts may be called up in a number of ways. One of the simplest methods is to call them up by name. This way a map may be viewed without requiring that a ship be within the area of the map. When a map is called up by name, the center of the map is presented in the map window. "Scroll" moves the list of available charts and lists them by chart number in the chart number window. "Show chart" causes VTRACK to display a currently selected chart. If, VTRACK is not in scanned chart mode, it is forced into scanned chart mode before the selected chart is displayed.

Chart Info

This window is used to display information about the chart concurrently being displayed in the map window. If VTRACK is not in scanned map mode, this window goes blank. Information presented here is the chart's number, title, scale, magnetic variation, depth units, projection, and revision date. "Bdrs" (borders) enables or disables the display of border margins around the maps. An "info window" contains much of the information described above.

Ship Tracks

Trails or tracks of where a ship has been may be displayed at the operators discretion. Such tracks may be thought of as "breadcrumbs" dropped by the ship as it moves along, leaving a trail. The breadcrumbs may be enabled or disabled for any ship, can be any available color, can be hidden from view or not, and can be connected with lines or not.

"Scroll" button scrolls the list of vehicles in the Ship Name Window. Any of the mentioned options is changeable on a ship-by-ship basis. At the end of the list of vehicles is an option for "All Vehicles". If this is displayed when one of the following buttons is selected, the action is applied to all the vehicles". If a particular parameter is not common to all of the vehicles when "All Vehicles" is displayed, the parameter's value or setting is displayed as "??". "Vessel name window" displays the name of the selected ship. "On", when enabled, will cause TBTRACK to save track marks for the ship shown in the "vessel name window". This does not, however, necessarily mean that the tracks will be visible. "View" makes visible the track marks for the ship shown in the "vessel name window" "Con" (Connect) causes TBTRACK to connect all displayed track marks with a line. "Del" (Delete) deletes all track marks for the ship shown in the "vessel name window". These track marks are not recoverable unless the data is rerun with track marks enabled. "Color→" selects a color for the track marks in two steps. First, a color for ship tracks is selected on the "color" table. Second, the "Color→" button is selected to attach the current ship track color to the ship shown in the "vessel name window" From this point on, track marks are dropped in the new color. "Color window" is a small square window on the ship tracks table that displays the color used for the track marks and connecting lines for the ship shown in the "vessel name window".

VTCC

VTCC is a section of VTRACK that handles communications with the tailbuoys. The setup of VTCC is done with an initialization file called VTCC.INI. This is an ASCII file that can be edited with a simple text editor.

GPS to UTC Time Offset—This is the time difference between GPS time and UTC time expressed in seconds. Example: CC_GPSUTC=7 . This offset is also derived by the tailbuoy solution computer-implemented process from the GPS ephemeris data. As soon as a value is determined by the computer-implemented process, the entered value is overwritten.

Participants Table—Lists the GPS units to be involved. The number of mobile units is defined by CC_NVEHICLES and represents the total number of ships and tailbuoys. For example: CC_NVEHICLES=4 (1 ship and 3 tailbuoys). The names used for the vehicles are defined by CC-NAMES. There must be a name for each ship, defined CC_NVEHICLES. For example: CC_NA4ES=ship Buoy1 Buoy2 Buoy 3.

Communications—Sets up a serial communication port on the computer. The interrupt request lines (IRQs) used by VTRACK are defined by CC_IRQS. For example: CC_IRQS=4 3. This will cause VTRACK to take over IRQ4 and IRQ3 for serial port communications. (Standard COMI serial port uses IRQ1, COM2 uses IRQ3.) The number of serial ports used by VTRACK is defined by CC_NPORTS. For example: CC_NNPORTS=2 .

Ports—Defines parameters for individual serial ports. A brief name for each port is given by CC_PORTFUNCS. The names are separated by any number of spaces. This is used in the VTCC display to reference the serial port. For example: CC_PORTFUNCS=Vc11 Vc12. The baud rates for each port are defined by CC BAUDS. For example: CC_BAUDS=9600 1200 . The base address for each port is defined by CC-BASES. For example: CC_BASES=3f8 2f8. This line will cause TBTRACK to use base addresses 3f8 (hex) and 2f8 (hex) for serial communications. (Standard COMI serial port uses base address 3f8 hex, COM2 uses 2f8 hex). The length of a data word for communication is given by CC_WORDLENS. This value may be set to seven or eight, depending on the data link and the type of data passed. For example: CC_WORDLENS=8 . The parity used for the serial port is set here. It may take on the values of NONE, EVEN, or ODD. For example: CC_PARITYS=NONE. The VTCC is accessed from TBTRACK via the "CC" button on the system table.

"S" Command

"Stream" serial port data to window—This is a three character command used to view the raw data stream that comes into and/or goes out of any of the serial ports. The command is formatted as follows: Snx; where "S" is the stream command, n is the port number (1 through "n" number of ports), and x is one of "1", "0", or "B" for input, output, or both, respectively. For example: s1b<Enter>; will show the input and output for the first serial port. The stream display may be turned off by entering "s0".

"U" Command

"Unpack" serial port data window is a three character command used to unpack and display the data stream that comes into and/or goes out of any of the serial ports. The command is formatted as follows: Unx ; where "U" is the Unpack command, "n" is the port number (1 through "n" number of ports), and "x" is one of "1", "0", or "B" for input, output, or both, respectively. For example: U1i<Enter>; will decode the data stream for the input into CPU 58 from the first serial port and display it in the stream window. The unpack display may be turned off by entering "u)".

"EXIT"

Typing in: exit<Enter>; will cause VTCC to exit and return to the VTRACK display.

BINARY ARCHIVE/REPLAY FILES

A naming convention useful for VTRACK binary files is MMDDHHMM.VHN where MMDDHHMM is the date and time of the beginning of the data where:

| | |
|---|---|
| MM | is the month; |
| DD | is the day; |
| HH | is the hour; |
| MM | is the minute; |
| VH | is the characters AH (for ship history); and |
| N | is a number that is usually "1 but will increment if more than one history file is created during the same minute. |

VTRACK archives at least one type of data record in the history file. The data segment of this record is 66 bytes long. When the record header and trailer are attached to the data, the entire record is 71 bytes long.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A mobile fleet exploration system for obtaining high accuracy relative earth position and velocity determinations amongst individual mobile units in the fleet from a plurality of GPS receiving stations distributed throughout the mobile fleet, the exploration system comprising:

at least one outlying individual mobile unit including means for obtaining a first time-sequence of pseudo-ranges and pseudo-range-rates to a plurality of GPS satellites;

a main mobile unit including means for obtaining a second time-sequence of pseudo-ranges and pseudo-range-rates to said plurality of GPS satellites;

navigation computer means for calculating a plurality of relative earth positions and velocities from an input comprising a sequence of delta-pseudo-ranges and delta-pseudo-range-rates relative to said plurality of GPS satellites derived from the respective pseudo-ranges and pseudo-range-rates relative to said individual mobile fleet units and said main mobile unit and including a Kalman filter for filtering said delta-pseudo-ranges using information from said delta-pseudo-range-rates;

associative means for pairing each pseudo-range in said first and second time-sequences of pseudo-ranges with a time-code indicating a time each respective pseudo-range was obtained;

communication means for transferring said first and second time sequences of pseudo-ranges to the navigation computer means and associative means; and differencing means for time-aligning according to said time code and subtracting the corresponding pseudo-ranges and pseudo-range-rates of said first time-sequence of pseudo-ranges and pseudo-range-rates from said second time-sequence of pseudo-ranges and pseudo-range-rates to produce a sequence of delta-pseudo-ranges and delta-pseudo-range-rates and for communicating said delta-pseudo-ranges and delta-pseudo-range-rates to the navigational computer means wherein a difference in relative positions and velocities amongst the individual mobile fleet units can be determined.

2. The system of claim 1, further comprising:

pseudo-range quality testing means for determining whether particular pseudo-ranges within said first and second time-sequences of pseudo-ranges exceed a predetermined minimum reliability threshold and for preventing any pseudo-ranges that do not exceed said predetermined minimum reliability threshold from being used in determining a position or a velocity in the navigation computer means.

3. The system of claim 2, wherein:

the pseudo-range quality testing means further comprises fault detection, isolation, and correction (FDIC) means for detecting whether a particular GPS satellite produces unreliable pseudo-ranges and for isolating any pseudo-ranges related to said particular GPS satellite from input to the navigation computer if said pseudo-ranges cannot otherwise be corrected.

4. The system of claim 1, further comprising:

computational means for correcting said sequence of delta-pseudo-ranges from the differencing means to represent a set of line-of-sight vectors to said GPS satellites as being non-parallel and for outputting a sequence of corrected delta-pseudo-ranges for input to the navigational computer means.

5. The system of claim 1, wherein the navigational computer means further comprises an interacting weighted-least-squares means for accepting a plurality of uncertainty levels derived from said Kalman filter wherein a plurality of satellite measurements can be weighted to produce said relative earth positions and velocities.

6. A method for obtaining high accuracy relative earth position and velocity determinations amongst individual mobile units in a fleet from a plurality of GPS signals received at stations distributed throughout the mobile fleet, the method comprising the steps of:

obtaining a first time-sequence of pseudo-ranges and pseudo-range-rates to a plurality of GPS satellites from at least one outlying individual mobile unit;

obtaining a second time-sequence of pseudo-ranges and pseudo-range-rates to said plurality of GPS satellites from a main mobile unit;

calculating a plurality of relative earth positions and velocities with a navigation computer from an input comprising a sequence of delta-pseudo-ranges and delta-pseudo-range-rates relative to said plurality of GPS satellites derived from respective pseudo-ranges and pseudo-range-rates relative to said individual mobile fleet units and using a Kalman filter to filter said delta-pseudo-ranges with information from said delta-pseudo-range-rates;

pairing each pseudo-range in said first and second time-sequences of pseudo-ranges in an associative means with a time-code indicating a time each respective pseudo-range was obtained;

communicating said first and second time sequences of pseudo-ranges to said navigation computer and associative means; and time-aligning according to said time code and subtracting corresponding pseudo-ranges and pseudo-range-rates of said first time-sequence of pseudo-ranges and pseudo-range-rates from said second time-sequence of pseudo-ranges and pseudo-range-rates in a differencing means to produce a sequence of delta-pseudo-ranges and delta-pseudo-range-rates and for communicating said delta-pseudo-ranges and pseudo-range-rates to said navigational computer wherein a difference in relative positions and velocities amongst the individual mobile fleet units can be determined.

7. The method of claim 6, further comprising the step of:

determining whether particular pseudo-ranges within said first and second time-sequences of pseudo-ranges exceed a predetermined minimum reliability threshold with a pseudo-range quality testing means and preventing any pseudo-ranges that do not exceed said predetermined minimum reliability threshold from being used in determining a position in said navigation computer means.

8. The method of claim 7, wherein:

the determining step further comprises detecting whether a particular GPS satellite is producing unreliable pseudo-ranges and isolating any pseudo-ranges related to said particular GPS satellite from input to the navigation computer if said pseudo-ranges cannot otherwise be corrected.

9. The method of claim 6, further comprising the step of:

correcting said sequence of delta-pseudo-ranges from said differencing means to represent a set of line-of-sight vectors to said GPS satellites as being non-parallel and outputting a sequence of corrected delta-pseudo-ranges for input to said navigational computer means.

10. The method of claim 6, wherein:

the calculating step further comprises an interacting weighted-least-squares method for accepting a plurality of uncertainty levels derived from said Kalman filter wherein a plurality of satellite measurements can be weighted to produce said relative earth positions and velocities.

* * * * *